United States Patent [19]

Ludlum

[11] 3,916,697

[45] Nov. 4, 1975

[54] ACCELEROMETER TILT ERROR COMPENSATOR

[75] Inventor: Bobby R. Ludlum, Panama City, Fla.

[73] Assignee: The United States of America as represented by the Secretary of the Navy, Washington, D.C.

[22] Filed: Oct. 15, 1974

[21] Appl. No.: 514,335

[52] U.S. Cl. ................................................ 73/504
[51] Int. Cl.² .................... G01P 15/08; G01P 15/14
[58] Field of Search ...... 73/504; 332/31 R; 340/198

[56] References Cited
UNITED STATES PATENTS

| | | | |
|---|---|---|---|
| 2,770,452 | 11/1956 | Miller | 73/504 |
| 2,942,864 | 1/1960 | Sikora | 73/504 |

Primary Examiner—James J. Gill
Attorney, Agent, or Firm—Richard S. Sciascia; Don D. Doty; Harvey A. David

[57] ABSTRACT

An accelerometer tilt error system is disclosed as comprising a gyroscope mounted on a vehicle or other platform, a reference signal generator, a multiplier for algebraically multiplying the output signals from said gyroscope and reference generator, and a low pass filter connected to the output of said analog multiplier. An accelerometer is also mounted on said vehicle or other platform, and a summer algebraically adds the output signals from said low pass filter and the aforesaid accelerometer. The output signal from said summer constitutes the tilt error compensated signal of said accelerometer and, thus, any suitable readout, control, or other apparatus may be connected for response thereto.

14 Claims, 2 Drawing Figures

ACCELEROMETER TILT ERROR COMPENSATOR

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention, in general, relates to error compensation and control systems and, in particular, is a system for gyroscopically correcting the tilt error of an accelerometer.

DESCRIPTION OF THE PRIOR ART

Heretofore, the tilt angle error of accelerometers was eliminated or effectively compensated for by mounting them on platforms which were gyroscopically or otherwise stabilized.

In gyroscopically stabilized platform cases, a gyroscope was mounted in such manner on the platform to be stabilized as to sense any tilting thereof, and then by means of appropriate actuators connected thereto would effect the repositioning thereof, so as to maintain the accelerometers in a level — that is, zero tilt — attitude.

In other situations, especially where great accuracy or rapid tilt correction was not required, the pendulum principle was employed to stabilize platforms.

In the former prior art situation where gyro stabilized platforms were used, the complexity of the overall tilt-error compensation devices were exceedingly complex, thereby causing them to be large in size, excessive in weight, and costly to construct, operate, and maintain. Moreover, due to the complexity of the apparatus involved, and the manufacturing precision required to prevent the improper operation thereof, the accuracy thereof sometimes left something to be desired. In addition, such platform stabilizing apparatus was somewhat delicate of structure and, therefore, had to be handled in an inordinantly careful manner.

In the latter prior art case, as previously suggested, pendulum stabilized platforms were usually not perfectly stabilized at any given instant if they were continuously subjected to external forces, thereby causing some error to usually exist in any accelerometers mounted thereon.

SUMMARY OF THE INVENTION

The instant invention overcomes many of the disadvantages of the prior art, in that it uses no moveable or stabilized platforms and, thus, it may be constructed with reduced size, weight, and cost.

Briefly, the subject invention comprises a gyroscope and accelerometer mounted directly on the device, object, or vehicle of which the acceleration is to be measured and connected in unique combination with a gyroscope rotor driver, analog multiplier, low pass filter, and summer in such manner that the tilt error signal produced by the tilted gyroscope effectively compensates the error signal produced by the similarly tilted accelerometer.

It is, therefore, an object of the invention to provide an improved accelerometer tilt error signal compensator.

Another object of this invention is to provide an improved method and means for compensating the tilt error produced by an accelerometer that is measuring the acceleration of a moving or unstable vehicle or other platform.

Still another object of the invention is to provide a new and improved gyroscopically tilt error compensated accelerometer system.

A further object of the invention is to provide an improved method and means for correcting the attitude deviation of a sonar system, including side scanning sonars, due to wobble or other movements of the platform upon which it is mounted.

Another object of this invention is to provide an improved automatic control signal for use in feedback control systems.

Still another object of this invention is to provide an improved object attitude deviation measurement and signal proportional thereto.

Another object of the invention is to provide a system for compensating the tilt errors of accelerometers that is more easily and economically manufactured, operated, and maintained.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
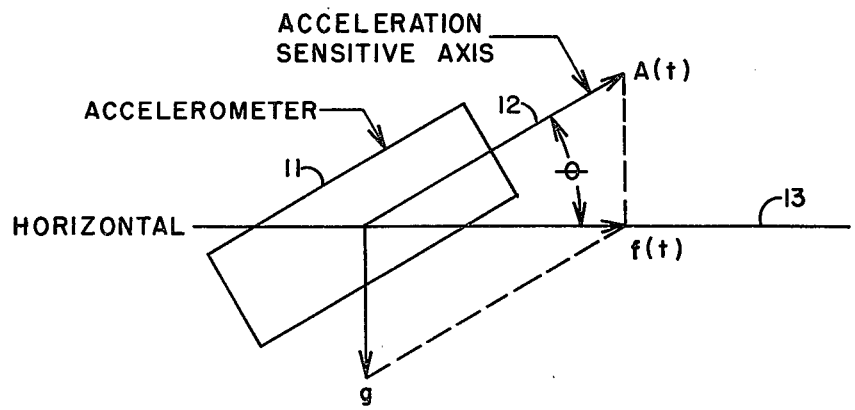
FIG. 1 is a schematic diagram of the forces applied to a tilted accelerometer by gravity and the tilting thereof which are effectively compensated by the system of FIG. 2.

Referring now to FIG. 1, there is shown an accelerometer 11 having an acceleration sensitive axis 12, both of which are positioned at an angle $\theta$ with respect to the horizontal 13. In addition to the aforementioned structural elements, the various and sundry forces, acceleration, and other parameters are depicted, all of which will be discussed more fully subsequently.

Figure 2:
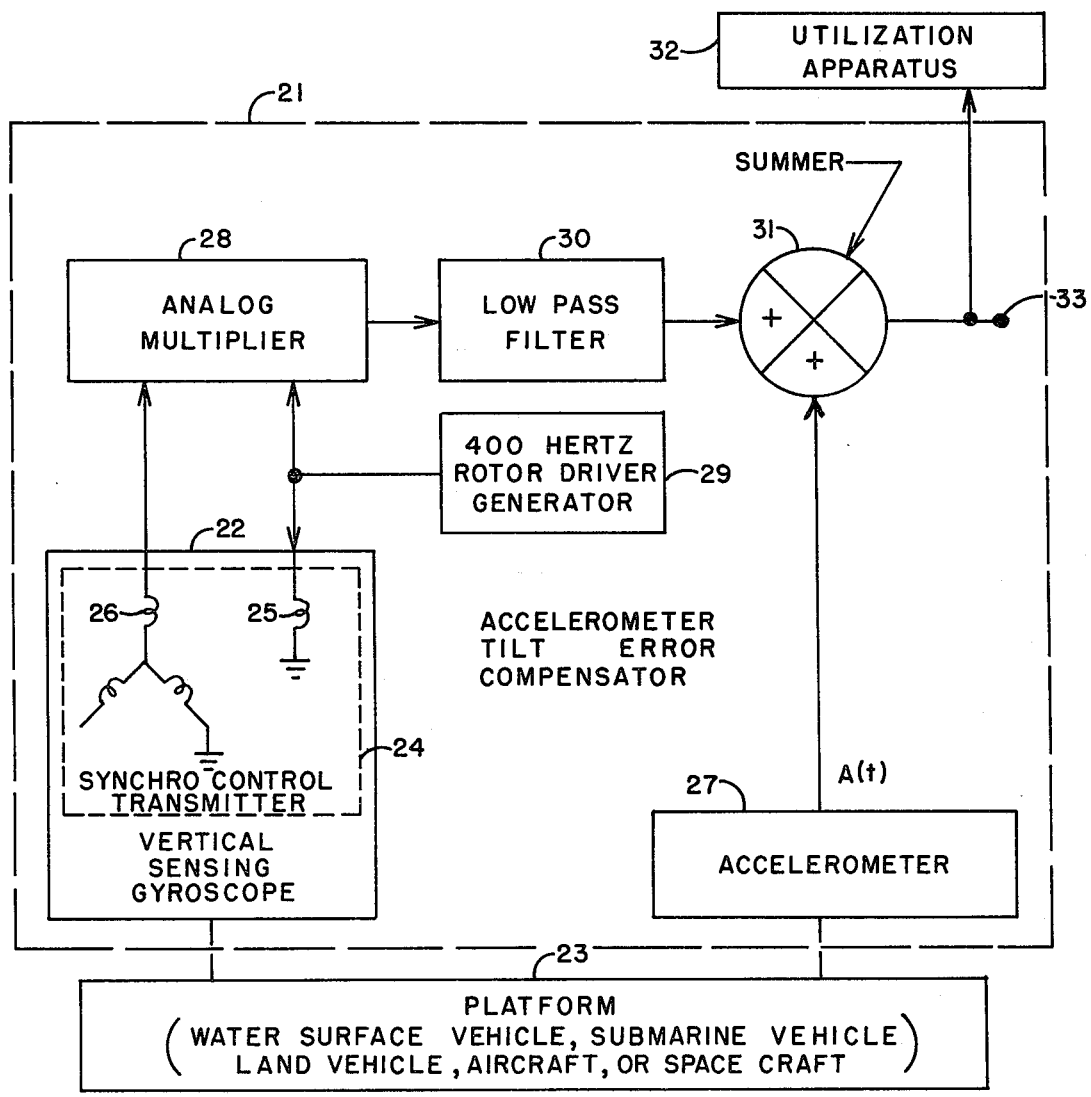
FIG. 2 is a block diagram of the system constituting the invention.

FIG. 2 depicts the instant invention 21 as including a vertical sensing gyroscope 22 which is structurally mounted on any suitable vehicle platform 23, the acceleration of which is to be measured.

Vertical sensing gyroscope 23, in this particular instance, is of the conventional type that has 2° of freedom. It contains, as an inherent part thereof, a synchro control transmitter 24, containing a rotor winding 25 and a stator winding 26, as is, likewise, common in vertical sensing gyroscopes, the former of which is responsive to a sinusoidal reference signal, and the latter of which produces a signal whose amplitude and polarity are proportional to the amount and direction of tilt thereof, respectively.

Although vehicle platform 23 is herein generally represented as being any mobile (or fixed) platform, the types thereof which would be suitable for use with the subject invention are practically unlimited. Nevertheless, it would appear to be noteworthy that vehicle platform 23 could be a land vehicle, a water surface vehicle, a submarine vehicle, an aircraft, a space craft, or any other suitable vehicle. Moreover, it could represent any moving or movable object, the accurate acceleration of which is to be measured, if and when it is in a mobile state.

Also mounted on vehicle platform 23 is an accelerometer 27 which, of course, in this particular situation, is the accelerometer that is to be used to measure the acceleration of vehicle platform 23, as it is driven — either by its own power or by some external power source — along a horizontal course.

The stator winding 26 output of vertical sensing gyroscope 22 is connected to one of the inputs of an analog multiplier 28, and the sinusoidal reference signal output of a 400 Hertz rotor driver signal generator 29 is connected to the rotor winding 25 of vertical sensing gyroscope 22 and to the other input of said analog multiplier 28. The output of analog multiplier 28 is connected to the input of a low pass filter 30 having a cutoff frequency and a damping ratio such as will cause it to have a transfer function that matches the transfer function of the aforesaid accelerometer 27, so as to thereby give them identical time and frequency responses. The output of low pass filter 30 is connected to one of the inputs of an algebraic summer 31, the other input of which is connected to the output of accelerometer 27. The output of summer 31 is connected to an output terminal 32 which, of course, is the output of the accelerometer tilt error compensator of this invention. Of course, the output signal from terminal 33 constitutes the corrected or tilt-compensated signal.

The output of summer 31 may, of course, be connected to any appropriate compatible utilization apparatus 32, such as, for example, a readout, a measuring device, a control system, the automatic deviation correction system of a sonar, or the like. Hence, it may readily be seen that the tilt compensation output signal from summer 31 may be used for many practical purposes, including measurement and control.

At this time, it would perhaps be noteworthy that all of the elements represented in block form in FIG. 2 are conventional, well known, and commercially available, per se; therefore, it is to be understood that it is their new and useful interconnections and interactions that cause the unique results to be effected thereby. Furthermore, although the system depicted in FIG. 2 is obviously quite simple, the aforesaid unique results produced thereby are exceedingly useful and important for many practical purposes. To be more explicit, the new combination of elements constituting this invention and shown in FIG. 2 provides the most expeditious method and means known for compensating for tilt errors otherwise inherently occurring in accelerometer output signals, and, thus, it is opined that the subject invention constitutes an advancement in the art of patentable significance, its simplicity notwithstanding.

THEORY OF OPERATION

When the acceleration axis of force-balanced accelerometer 11 is tilted at an angle $\theta$ with respect to the horizontal 13 (as illustrated in FIG. 1), it responds to a component of the earth's gravitational field equal to $g \sin \theta$, where $g$ is the acceleration due to gravity. Such component, in fact, becomes an error component which is undesirably added to the output signal of an accelerometer that is and is intended to measure other acceleration inputs supplied thereto, probably by the mobile platform to which it is firmly attached. Hence, the tilting of the acceleration sensitive axis of an accelerometer such as accelerometer 11 causes false or incorrect acceleration measurements to be made thereby.

Referring again to FIG. 1, because accelerometer 11 is tilted at an angle $\theta$ with the horizontal, it would not measure the correct acceleration along the horizontal, the direction of movement assumed in this particular case, and the direction of the acceleration desired to be measured. In such case, let:

$f(t) =$ the acceleration along the horizontal axis to be measured; and $A(t) =$ the accelerometer output voltage.

Then $$A(t) = Kf(t) \cos \theta - Kg \sin \theta, \quad (1)$$

where $K$ is the accelerometer scale factor in volts per g of acceleration; and $Kg \sin \theta$ is the error voltage due to tilting the acceleration sensitive axis in the gravitational field.

The output voltage being produced by the acceleration being measured is also modified due to the axis tilt, and it is equal to the term $Kf(t) \cos \theta$ of the above-mentioned equation (1). For small tilt angles, this error is negligible, being only 1% for an angle $\theta$ of 8°, but the gravity error term for a tilt angle of $\theta = 8°$ is about 14%. Because the subject invention uses a vertical sensing gyroscope 22 mounted on its platform 23 (see FIG. 2) to sense the tilt angle of said vehicle platform 23, its alternating current (AC) output voltage amplitude is proportional to $\sin \theta$. When converted to a direct current (DC) voltage and added to the output voltage of accelerometer 27, the gravity error is deleted therefrom. A mathematical description of such performance is as follows:

The accelerometer output voltage $A(t)$ is expressed in the aforementioned equation (1), with the terms thereof being the same. In this preferred embodiment the synchro control transmitter drive signal produced by rotor driver 29 is a 400 Hertz sinusoidal voltage $$V_R(t) = V \sin \omega t, \quad (2)$$

where $V =$ the peak voltage, $\omega = (2\pi)$ (frequency in Hertz), and $t =$ time in seconds.

If the synchro control transmitter stator output signal of gyroscope 22 is $V_S(t)$, then $$V_S(t) = (k\, V \sin \omega t) \sin \theta, \quad (3)$$

where $k =$ the transformation ratio of the synchro control transmitter of the gyroscope.

The output voltage $V_m(t)$ from analog multiplier 28 is expressed as $$V_m(t) = [V_R(t)][V_S(t)]\left[\frac{1}{m}\right] \quad (4)$$

where $1/m$ is the multiplier scale factor. Thus:

$$V_m(t) = \frac{V_R(t)V_S(t)}{m} = \frac{(V \sin \omega t)(k\, V \sin \omega t) \sin \theta}{m} \quad (5)$$

$$V_m(t) = \frac{k V^2}{m} \sin \theta \sin^2 \omega t = \frac{k V^2}{m}(\sin \theta)(\tfrac{1}{2} - \tfrac{1}{2} \cos 2\omega t) \quad (6)$$

$$V_m1(t) = \frac{k V^2 \sin \theta}{2m} - \frac{k V^2 \sin \theta}{2m}(\cos 2\omega t) \quad (7)$$

In equation (7), the term $$\frac{kV^2 \sin \theta}{2m}$$

is the DC term, and the term $$\frac{kV^2 \sin \theta}{2m}(\cos 2\omega t)$$

is the second harmonic term.

Because low pass filter 30 has been designed to have a cutoff frequency less than $w/\pi$, it discards the aforesaid second harmonic term and only passes the aforementioned DC term. Therefore, the output voltage therefrom is expressed as $$V_{LPF} = \frac{kV^2}{2m}\sin\theta. \quad (8)$$

And this $V_{LPF}$ is the voltage that is added to the output voltage $A(t)$ from accelerometer 26 by means of summer 27, so as to produce $V(t)$ at the output thereof. So doing may be expressed as $$V_{out}(t) = A(t) + V_{LPF} = kf(t)\cos\theta - kg\sin\theta + \frac{kV^2}{2m}\sin\theta \quad (9)$$

The circuit parameters should be chosen to make $$kg = \frac{kV^2}{2m}. \quad (10)$$

Then $$V_{out}(t) = Kf(t)\cos\theta - \frac{kV^2}{2m}\sin\theta + \frac{kV^2}{2m}\sin\theta \quad (11)$$

$$V_{out}(t) = Kf(t)\cos\theta. \quad (12)$$

In order to provide dynamic elimination of the gravity error term, the cutoff frequency and damping ratio of low pass filter 30 should be chosen, as previously indicated, to match the transfer function of low pass filter 30 to that of accelerometer 27, thereby giving them identical time and frequency responses.

From the foregoing, it may readily be seen that the gravity error term and, thus, the tilt error have been eliminated and the acceleration of vehicle platform 23 has been accurately measured in the desired direction — in this example, in the horizontal direction.

MODE OF OPERATION

Obviously, after the above discussion of the theory of operation of the invention, the actual operation thereof will be seen as being very simple.

As vehicle platform 27 moves along its intended course, it will ordinarily wobble or otherwise change attitude. Nevertheless, if it is properly guided to move along or hunt along its desired course, it will continue to do so in spite of any attitude aberrations. However, in the event it is necessary to accurately measure the acceleration thereof at any given instant or even continuously in the horizontal direction, such aberrations will adversely affect the making of such measurements and tilt error would be included therein if the system of FIG. 2 were not employed to automatically correct such errors.

Very simply, vertical sensing gyroscope 22 detects any tilt of vehicle platform 23 and produces a signal whose amplitude and polarity are proportional thereto. Analog multiplier 28, driver 29, and low pass filter 30 combine to produce a DC output voltage that when algebraically added to the output voltage of accelerometer 27, makes a correction thereof in such manner as to delete the gravity component of the measured acceleration along the tilted axis. Thus, the measured tilt acceleration is corrected to read what it would be, say, along a horizontal direction, the intended direction of travel of vehicle platform 23, or any other desired direction.

Notwithstanding the fact that the subject invention is very simple in structure and operation, it is exceedingly useful in performing a valuable function, and it does it in a unique manner heretofore unknown. Hence, it appears to be a very worthwhile advancement in the art.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A tilt error compensation system, comprising in combination:
   gyroscope means, having a synchro control transmitter, including a rotor winding input and a stator winding output, adapted for being mounted on a predetermined platform for detecting the attitude thereof with respect to a first axis having a predetermined attitude in space and for producing a first signal at the output thereof that has a polarity and amplitude that is proportional to the deviation thereof therefrom;
   means adapted for being mounted on said predetermined platform for detecting the acceleration thereof along a second axis and for producing a second signal proportional thereto;
   analog multiplier means having a pair of inputs and an output, with one of the inputs thereof connected to the stator winding output of said gyroscope means;
   means connected to the rotor winding input of said gyroscope means and the other input of said analog multiplier means for supplying a predetermined reference signal thereto;
   means connected to the output of said analog multiplier means for filtering the output signal thereform; and
   means connected to the outputs of said filtering means and the aforesaid platform acceleration detecting means for albebraically summing the output signals therefrom.

2. The device of claim 1, wherein said predetermined platform comprises a water surface vehicle.

3. The device of claim 1, wherein said predetermined platform comprises a submarine vehicle.

4. The device of claim 1, wherein said predetermined platform comprises an aircraft.

5. The device of claim 1, wherein said predetermined platform comprises a space craft.

6. The device of claim 1, wherein said predetermined object comprises a mobile platform.

7. The device of claim 1, wherein said gyroscope means comprises a vertical sensing gyroscope.

8. The device of claim 1, wherein said means adapted for being mounted on said predetermined platform for detecting the acceleration thereof along a second axis and for producing a second signal proportional thereto comprises an accelerometer.

9. The device of claim 1, wherein the means connected to the rotor winding input of said gyroscope means and the other input of said analog multiplier means for supplying a predetermined reference signal thereto comprises a 400 hertz rotodriver generator.

10. The device of claim 1, wherein said means connected to the output of said analog multiplier means for filtering the output signal therefrom comprises a low pass filter.

11. The invention of claim 1, further characterized by a utilization apparatus connected to the output of said algebraic summing means.

12. A tilt error compensation system comprising in combination:
  a vertical sensing gyroscope, having a synchro control transmitter incorporating a rotor winding and a stator winding, adapted for being mounted on a predetermined platform;
  an analog multiplier having a pair of inputs and an output, with one of the inputs thereof connected to the stator winding of said vertical sensing gyroscope;
  a reference signal generator, with the output thereof connected to the other input of said analog multiplier and the rotor of said vertical sensing gyroscope;
  a low pass filter connected to the output of said analog multiplier;
  an accelerometer adapted for being connected to the aforesaid predetermined platform; and
  an algebraic summer connected to the output of said low pass filter and said accelerometer.

13. The device of claim 12, wherein said predetermined platform is a towed marine vehicle.

14. The invention of claim 12, further characterized by a utilization apparatus connected to the output of said algebraic summer.

* * * * *